United States Patent
Klinger et al.

(12)

(10) Patent No.: US 6,427,760 B2
(45) Date of Patent: Aug. 6, 2002

(54) AIR-CONDITIONING SYSTEM FOR A MOTOR VEHICLE

(75) Inventors: Dietrich Klinger, Heubach; Dieter Schmadl, Marbach; Werner Schwahn, Schwieberdingen; Klaus Voigt, Bietigheim-Bissingen, all of (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/817,220

(22) Filed: Mar. 27, 2001

(30) Foreign Application Priority Data

Apr. 1, 2000 (DE) .......................... 100 16 433

(51) Int. Cl.⁷ .............................. B60H 1/32
(52) U.S. Cl. .......................... 165/42; 62/244
(58) Field of Search ................ 62/244; 165/42, 165/43; 237/12.3 A

(56) References Cited

U.S. PATENT DOCUMENTS

| | | | |
|---|---|---|---|
| 5,000,259 A | * 3/1991 | Forrest ................ | 237/12.3 A |
| 5,016,704 A | 5/1991 | Ono ................... | 165/1 |
| 5,836,380 A | * 11/1998 | Takeshita et al. ..... | 165/43 |
| 6,019,163 A | * 2/2000 | Saida et al. ......... | 165/42 |
| 6,131,652 A | * 10/2000 | Ito et al. ............ | 62/244 |
| 6,206,092 B1 | * 3/2001 | Beck et al. .......... | 165/42 |

FOREIGN PATENT DOCUMENTS

| | | |
|---|---|---|
| DE | 44 33 814 | 3/1996 |
| DE | 196 43 123 | 5/1998 |
| DE | 198 35 286 | 2/2000 |

* cited by examiner

*Primary Examiner*—William E. Tapolcal
(74) *Attorney, Agent, or Firm*—Foley & Lardner

(57) ABSTRACT

Disclosed is an air-conditioning system for a motor vehicle with which individual zones of the interior can be individually air-conditioned. The air-conditioning system is divided by means of at least one dividing wall into sub-regions, with the dividing wall having a dividing wall opening which can be closed off. The heating or air-conditioning system improves the safety, for example, by reducing the amount of condensation on windows, while conserving installation space. In a first region (B1 or B2 or B3 or B4), the partial air stream flowing therethrough can flow through a sub-region (22HL or 22VL or 22VR or 22HR) of heater (22), and the partial air stream, which has already been heated in the first region (B1 or B2 or B3 or B4) can after passing through the dividing wall opening (82R, 82L), also flow through a sub-region (22FL or 22RL or 22RR or 22FR), located in the second region (B2 or B1 or B4 or B3) of the heater (22).

7 Claims, 4 Drawing Sheets

AIR-CONDITIONING SYSTEM FOR A MOTOR VEHICLE

BACKGROUND OF THE INVENTION

The present invention relates to an air-conditioning system for a motor vehicle with which individual air-conditioning zones of the interior of the vehicle can be supplied with air that is independently conditioned separately.

U.S. Pat. No. 5,016,704 discloses such an air-conditioning system that is divided into two halves by a dividing wall downstream of the evaporator in the direction of air flow. A first half serves to air-condition the interior front space, while the second serves to air-condition the interior rear space. The heater penetrates the dividing wall so that there are parts of the heater in each half. Downstream of the heater, the dividing wall has an opening that can be closed off with a pivoting flap. In the closed position of the flap, the front space and rear space can be air-conditioned separately, and in the open position, the entire air-conditioned air stream is fed to the front space. The supply of air to the rear space is then shut off. It is desirable to route air into the front space instead of into the rear space, in particular, when the window panes are covered by condensation or iced up, in order to improve visibility and thus safety.

A limitation with this known air-conditioning system is that, although the partial air stream for air-conditioning the rear can be completely conducted into the front space through the dividing wall opening, it is not possible, conversely, for a partial air stream intended for air-conditioning the front space to be conducted through the opening and into the rear space. Furthermore, with this air-conditioning system it is only possible to separately air-condition the front space and the rear space. A left/right division, and thus separate air-conditioning of the left-hand and right-hand halves of the interior of the vehicle is not provided.

SUMMARY OF THE INVENTION

One object of the present invention is to provide an improved air-conditioning system with which air can be conditioned separately in each case for the different air-conditioning zones of the vehicle, and with which air can be conducted through two adjacent regions in an improved way.

Another object of the invention is to provide an air-conditioning system in which the level of safety can be improved, for example, as a result of reducing condensation on the windows.

Still another object of the invention is to provide an air-conditioning system having an installation space that is as small as possible.

It is also an object of the invention to provide an improved method of air-conditioning a motor vehicle.

In accomplishing these and other objects, there has been provide in accordance with one aspect of the present invention an air-conditioning system for a motor vehicle, comprising an evaporator for generating cold air; a heater for generating warm air, with the heater having at least one dividing wall for dividing the air-conditioning system into at least two regions downstream of the evaporator, with the heater being present in each of the regions, and with the dividing wall having a dividing wall opening; and a flap for selectively closing the dividing wall opening. The opening and the flap are arranged such that first partial air stream conducted in a first region flows through a first heater sub-region located in the first region to produce a first heated partial air stream that can selectively be subsequently directed with said flap to flow through a second heater sub-region located in a second region, after passing through the dividing wall opening.

In accordance with another aspect of the invention, there has been provided a method for air-conditioning a motor vehicle, comprising: generating cold air by passing air through an evaporator; generating warm air by passing at least a partial stream of the cold air through a heater, the heater having at least one dividing wall for dividing the air-conditioning system into at least two regions downstream of the evaporator, with the heater being present in each of the regions, and the dividing wall having a dividing wall opening; and selectively closing the dividing wall opening to selectively conduct a first heated partial air stream, conducted in a first region through a first heater sub-region located in the first region, through a second heater sub-region located in a second region, after passing through the dividing wall opening, whereby the first heated partial air stream is passed through the heater twice.

Further objects, features and advantages of the present invention will become apparent from the detailed description of preferred embodiments of the invention that follows, when considered together with the accompanying figures of drawing.

BRIEF DESCRIPTION OF THE DRAWINGS

The invention is explained in detail below by means of exemplary embodiments and with reference to the drawings, in which.

DETAILED DESCRIPTION OF THE PREFERRED EMBODIMENTS

Figure 1:
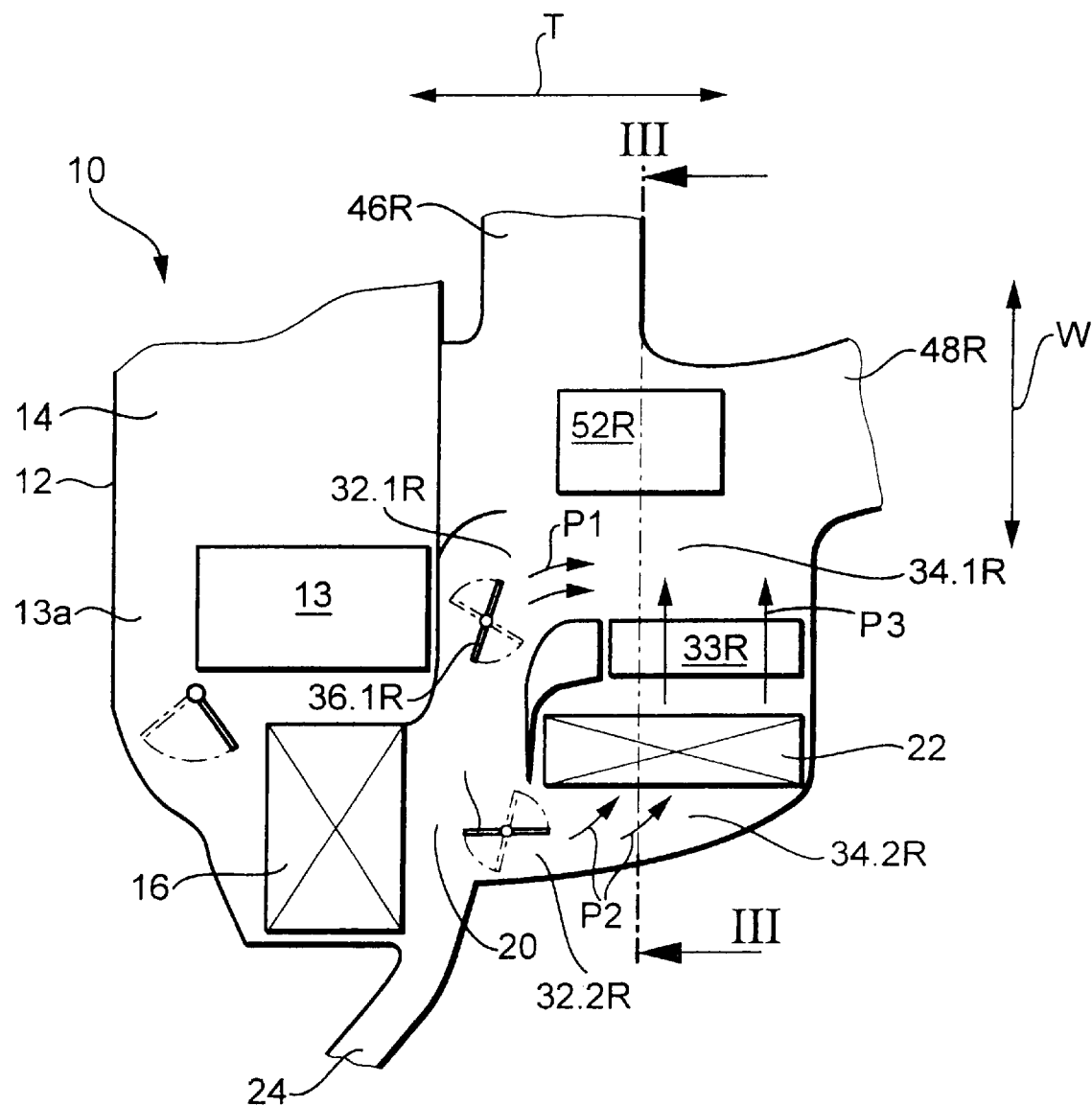
FIG. 1 shows a cross section through a schematically illustrated air-conditioning system according to the invention, along the line I—I in FIG. 3 in the vicinity of the air routing means for air which can be supplied to a front space of the interior of the vehicle.

The invention provides an air-conditioning system wherein, in a first region, the partial air streams conducted in this region can flow through a first sub-region of the heater, and the partial air stream that has already been heated in the first region can also flow, after passing through the dividing wall opening, through a second sub-region, located in a second region of the heater.

In this way, if the need should arise, at least one partial air stream can be heated twice by the heater, so that the air reaches a higher temperature and, for example, condensation on windows can be removed more satisfactorily. This is advantageous particularly in the start-up phase during cold weather.

According to another aspect of the invention, an air stream controller is provided in at least one of the regions in the air-conditioning system, such that the air stream controller can be switched in a first operating mode so that the air can flow in a first direction through a sub-region of the heater and in a second operating mode, the air can flow through the heater in a direction opposite to the first direction.

With this possibility of varying the flow direction through the heater, various ways of routing the air are possible. For example, either all the air can be supplied to the front space, or all the air can be supplied to the rear space. If appropriate, partial streams can flow through the heating heat exchanger twice, as described above.

In one preferred embodiment of the invention, the air stream control comprises two air flaps, the first air flap being arranged between a cold air region located between the evaporator and the heater, and a first space arranged on a first side of the heater. The second air flap is arranged between the cold air region and a second space arranged on a second side of the heater.

The routing of the air can be implemented in a particularly advantageous way, in particular without excessively large pressure losses, if the heater is arranged so as to lie flat in the installed position. Most preferably, the heater lies in an approximately horizontal attitude, and the first space is arranged above the heater, and the second space is arranged beneath the heater.

Three dividing walls are preferably provided for forming a total of four regions, arranged one next to the other. In this way, the air-conditioning system can be of elongated construction in the transverse direction with respect to the direction of travel of the vehicle, and the heater body has its greatest dimension in the transverse direction with respect to the direction of travel. This also has the advantage that the air-conditioning system can be arranged in the dashboard, in such a way that it does not extent downwardly, for example, in the region of the center console, so that space is thus kept free for additional devices, such as navigation equipment, radios or the like. Dividing wall openings are provided in that dividing wall which divides a first region assigned to the front zones in the vehicle and a second region assigned to the rear zones in the vehicle interior. The air conducted in the regions assigned to the rear space can then be selectively supplied to the front space, and vice versa.

To conserve installation space, it is advantageous if the outer regions are assigned to the rear space and the inner regions are assigned to the front space. The air ducts that are connected to the air-conditioning system and conduct the air to the assigned zones can then be arranged in a space-saving manner.

Turning now to the drawings, a heating or air-conditioning system 10 according to the invention, which is illustrated schematically in the drawings, has a housing 12 for conducting air that is to be air-conditioned. Recirculated air and/or fresh air is fed for cooling to an evaporator 16 via a blower (not illustrated) and a filter 13 arranged in an air supply duct 14, or a filter by pass 13a. The air cooled in the evaporator 16 emerges from the evaporator 16 and enters a cold air region 20 that extends downstream of the evaporator 16 over the entire height of the evaporator 16.

A heater 22 is arranged, preferably so as to lie flat, downstream of the evaporator 16 in the direction of the air flow. The heater 22 is embodied as a heat exchanger through which a coolant for a drive assembly of the motor vehicle can flow, and optionally also has electrical heating elements, such as is known for example from DE 44 33 814 A1, the disclosure of which is hereby incorporated by reference.

A water outlet 24, through which condensation water condensed in the evaporator can drain, is provided at the lower end of the cold air region 20.

The air-conditioning system 10 according to the invention is suitable for air-conditioning, for example, four different zones in the interior of the vehicle. The four zones are generally, for example, in a sedan, the driver region, designated by VL (front left), the front seat passenger's region, designated by VR (front right), the rear left region, designated by HL (rear left) and the rear right region, designated by HR (rear right).

In order that four regions can be air-conditioned separately, the air-conditioning system is preferably divided downstream of the cold air region 20 by three dividing walls 26, 28, 30 into four regions B1, B2, B3, B4 which lie one next to the other and which are respectively assigned to the zones HL, VL, VR and HR. The dividing walls extend, in terms of the direction of the air stream, both upstream and downstream of the heater 22 from the cold air region 20 to the outlet openings to which air ducts to the vehicle interior are connected. The regions B1, B2, B3, B4, which are arranged next to one another and in each of which a partial air stream for supplying the respective zone HL, VL, VR and HR is conducted, are thus, pneumatically separated.

The heater 22, which is illustrated schematically in FIG. 4, is typically embodied in a known fashion as a heat exchanger, and either the coolant of the drive assembly (engine) flows through constantly, or it has a coolant control valve (not illustrated in more detail) with which the coolant flow can be controlled. Each sub-region 22HL, 22VL, 22VR and 22HR of the heater, located in its respective region B1, B2, B3, B4, is thus at the same temperature.

The air-conditioning system with its evaporator 16 and heater 22 is of elongated design in its transverse direction, i.e., in the direction of the double arrow 31, so that the sub-regions 22HL, 22VL, 22VR and 22HR of the heater 22, located in the individual regions B1, B2, B3, B4, are large enough to be able to sufficiently heat up the respective partial air stream while at the same time the air-conditioning system is kept as small as possible in its height direction H and depth direction D.

Figure 2:
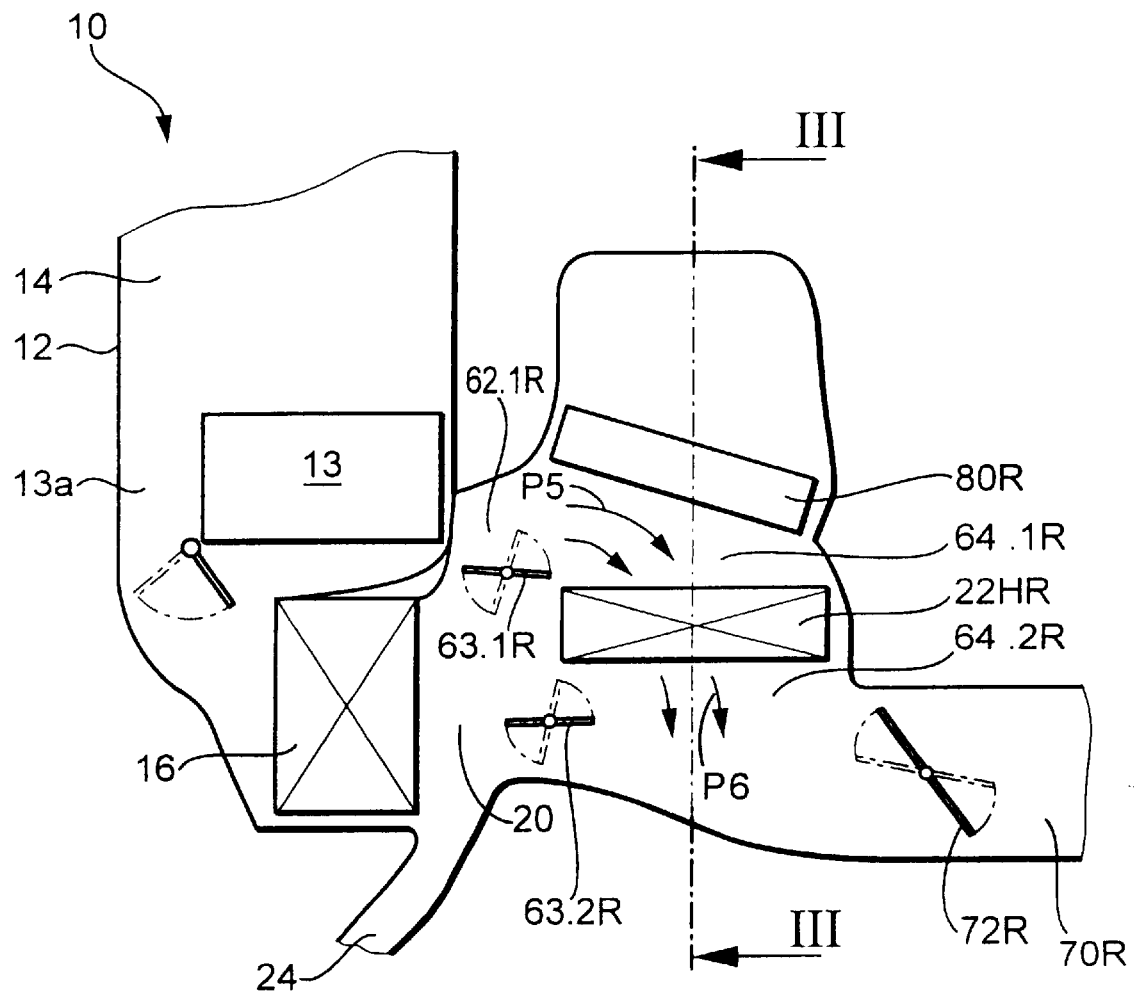
FIG. 2 shows a cross section of the schematically illustrated air-conditioning system according to the invention, which cross section runs parallel to the cross section in FIG. 1 along the line II—II in FIG. 3 in the vicinity of the air routing means with air which can be supplied to a rear space of the interior of the vehicle.

In order to understand the design of the air-conditioning system according to the invention, it is sufficient to consider the cross sections from FIGS. 1 and 2 along the lines I—I and II—II of FIG. 3, together with the illustration in FIG. 3 of a first exemplary embodiment. The other regions are of mirror image design.

Firstly, the regions and elements of the air-conditioning system according to the first exemplary embodiment that are applicable to air-conditioning the front space VR will be described with reference to FIGS. 1 and 3. The corresponding air flaps or valves are for the most part each illustrated in their open and closed positions.

From the cold air region 20, cold air can enter (arrow P1) a first space (34.1R) via a first cold air duct 32.1R arranged above the heater 22. The cold air duct 32.1R can be selectively closed off by means of a first flap 36.1R. Cold air can flow into a second space 34.2R located on the lower side of the heater 22, via a second cold air duct 32.2R that can be selectively closed off with a second flap 36.2R. The cold air can enter (arrow P2) the sub-region 22VR of the heater 22 from the underside and flow through the sub-region 22VR and be heated in the process. The warm air produced in this way (arrow P3) can enter the first space 34.1R via a warm air louver flap 33R and be mixed with the cold air in the first space 34.1R.

The first space 34.1R is adjoined by a defrost air duct 46R, an air duct 48R leading to venting nozzles (adjustable directional air vents) arranged in the dashboard, and a foot well air duct 52R. The air ducts can each be selectively closed by means of flaps which are not illustrated.

The air ducts 46R, 48R and 52R each lead only into the right-hand side of the vehicle, as the respective index "R" on each reference symbol is intended to indicate, with the result that the sub-region between the dividing walls 28 and 30 serves to condition the air for the zone VR.

Because the air-conditioning system in this region is of mirror-symmetrical construction with respect to the center plane M, the air for the zone VL is conditioned in an analogous way in the sub-region B2 between the dividing walls 26 and 28 and conducted into corresponding air ducts from the corresponding space 34.1L.

The two inner sub-regions B2 and B3 between the dividing walls 26 and 30 thus serve to condition the air for the front space, utilizing air flowing through the heater sub-regions 22VL and 22VR from top to bottom in the operating mode described, in order to generate warm air.

Figure 3A:
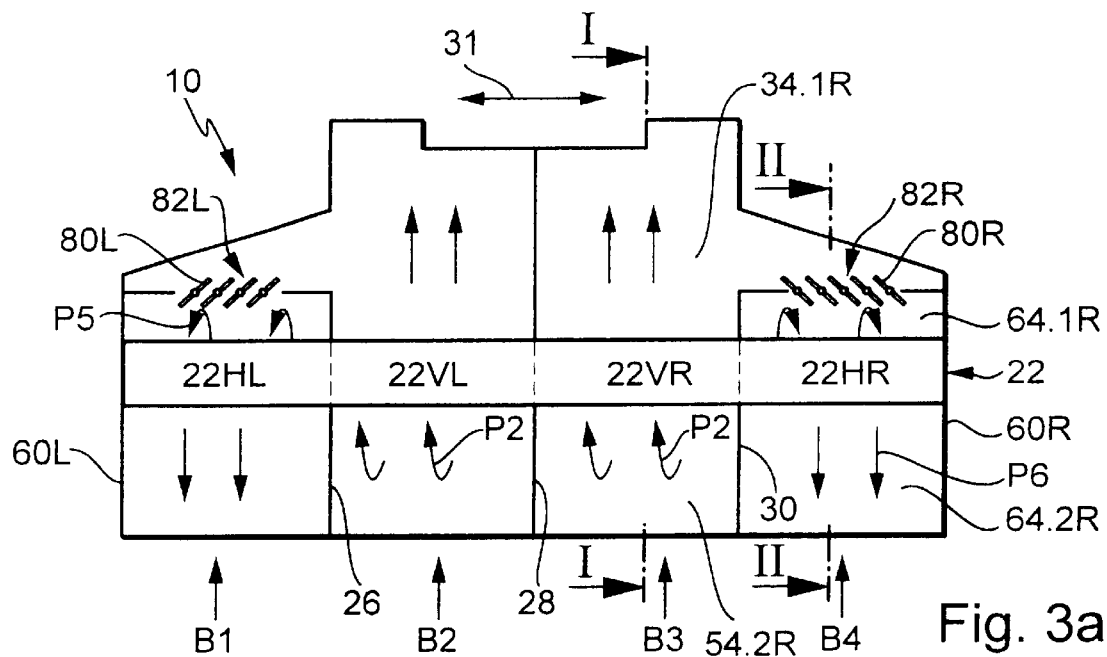
FIGS. 3a to 3c show cross sections of the air-conditioning system according to the invention along the lines III—III in FIGS. 1 and 2 in different operating modes.
Figure 3B:
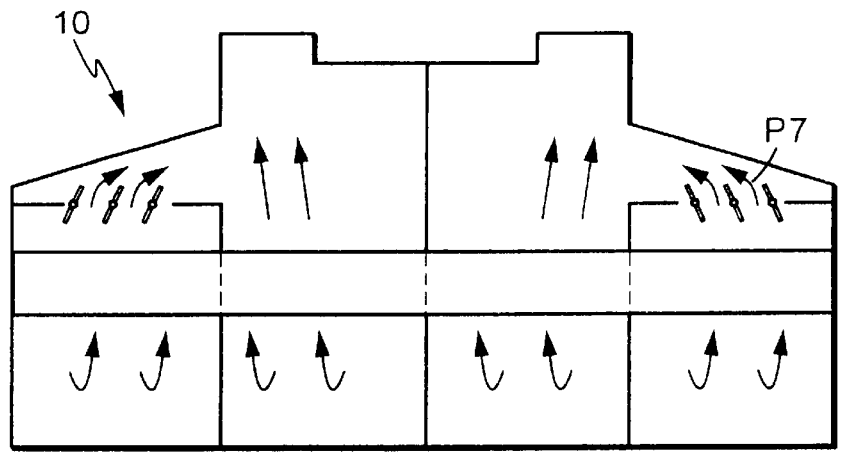
Figure 3C:
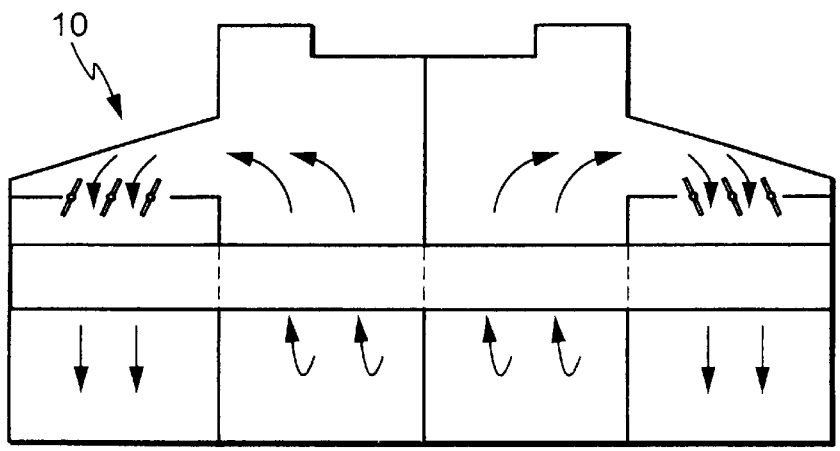

In addition to the two inner sub-regions B2 and B3, further sub-regions B1 and B4 are arranged toward the sides of the air-conditioning system in an outward direction (FIGS. 3a to 3c). The sub-region B4 between the dividing wall 30 and a side wall 60R of the housing 12 is assigned to the right of the rear space (HR), and correspondingly the sub-region B1 between the left-hand dividing wall 26 (illustrated in FIG. 3) and a left-hand side wall 60L is assigned to the left of the rear space (HL).

The regions and elements of the air-conditioning system according to the first exemplary embodiment which are applicable to air-conditioning the rear space HR will now be explained with reference to FIGS. 2 and 3a.

FIG. 2 shows a cross section along the line II—II in FIGS. 3a to 3c, that is to say through the sub-region B4 in which the air for the zone HR is conditioned. Here, cold air can flow via a cold air duct 62.1R and a flap 63.1R into a space 64.1R located on the upper side of the heater 22, and can enter (arrow P5) the sub-region 22HR of the heater 22 from above, and be heated there. The warm air emerging from the sub-region 22HR flows directly (arrow P6) into a space 64.2R located underneath the heater 22. Furthermore, cold air can also flow into the space 64.2R underneath the heater 22 via a flap 63.2R, and can be mixed with the warm air in this space 64.2R. From the space 64.2R, the air having a specific temperature can be supplied to the corresponding rear space zone HR via a rear air duct 70R, which can be selectively closed off with a rear air duct flap 72R.

The air for the rear space zone HL can be conditioned in an analogous way.

Furthermore, as illustrated in FIGS. 2 and 3a to 3c, the region 64.1R is separated from the adjacent region B2 and the adjacent space 34.1R, in the upward direction by a louver flap 80R. The louver flap 80R is part of the dividing wall 30 and closes off a dividing wall opening 82R of the dividing wall 30, with the result that when the louver flap 80R is opened air can flow from the space 34.1R into the space 64.1R, or vice versa.

In this embodiment, the following operating modes, illustrated in FIGS. 3a to 3c, can be implemented. The illustrations in these figures are only schematic, and not all the elements that were actually visible in the sectional view are illustrated, for clarity.

In a first operating mode (illustrated in FIG. 3a), the air is conducted as described above. In FIG. 3a, illustrated for better clarity, only the warm air streams and the partial air streams that are to be heated are illustrated. In the region B3 or B2, the air flows through the heater 22 from the bottom to the top, into the space 34.1R or 34.1L, and through the air duct into the front space zones VL and VR. In the regions B4 and B1, the air that is to be heated is conducted from the top to the bottom through the heater 22, through corresponding positions of the cold air flaps 63.1R and 63.2R and conducted through the rear space air duct to the rear space zones HR and HL. The dividing wall openings 82R and 82L are closed off by the louver flaps 80R and 80L. In this first operating mode, the individual zones VL, VR, HL, and HR can be air-conditioned separately and independently.

In a second operating mode illustrated in FIG. 3b, air flows in region B3, as described above and as illustrated in FIG. 1 by the arrows, through the heater 22 from the bottom to the top and into the space 34.1R, and from there into the air ducts 46R, 48R and 52R and into the zone VR. The cold air flap 36.1R is preferably closed. In the region B4, the rear air flap 72R and the cold air flap 63.1R are closed, and the flap 63.2R is opened, with the result that air can then flow from the bottom through the heater, from which it enters the space 64.1R as warm air. If the louver flap 80R is opened, this warm air enters the space 34.1R (arrow P7) and can additionally be supplied from there to the front space zone VR via the air ducts 46R, 48R, 52R. Analogous routing of the air is possible in regions B2 and B1. In this way, in this operating mode, all the partial air streams can be supplied to the front space as warm air.

In a third operating mode illustrated in FIG. 3c, the routing of the air in the individual regions is implemented in precisely the same way as in the first operating mode. However, the air ducts 46R, 48R, 52R are now closed, and the louver flaps 80R are opened so that warm air can flow from the space 34.1R into the space 64.1R and from there can flow through the heater a second time. From the space 64.2R, the air then flows via the rear space air duct 70R into the rear space zone HR. Analogous routing of the air is possible in regions B2 and B1. Thus, in this third operating mode, all the partial air streams can be supplied as warm air to the rear space, with a portion of the air passing through the heating heat exchanger 22 a second time.

Figure 4A:
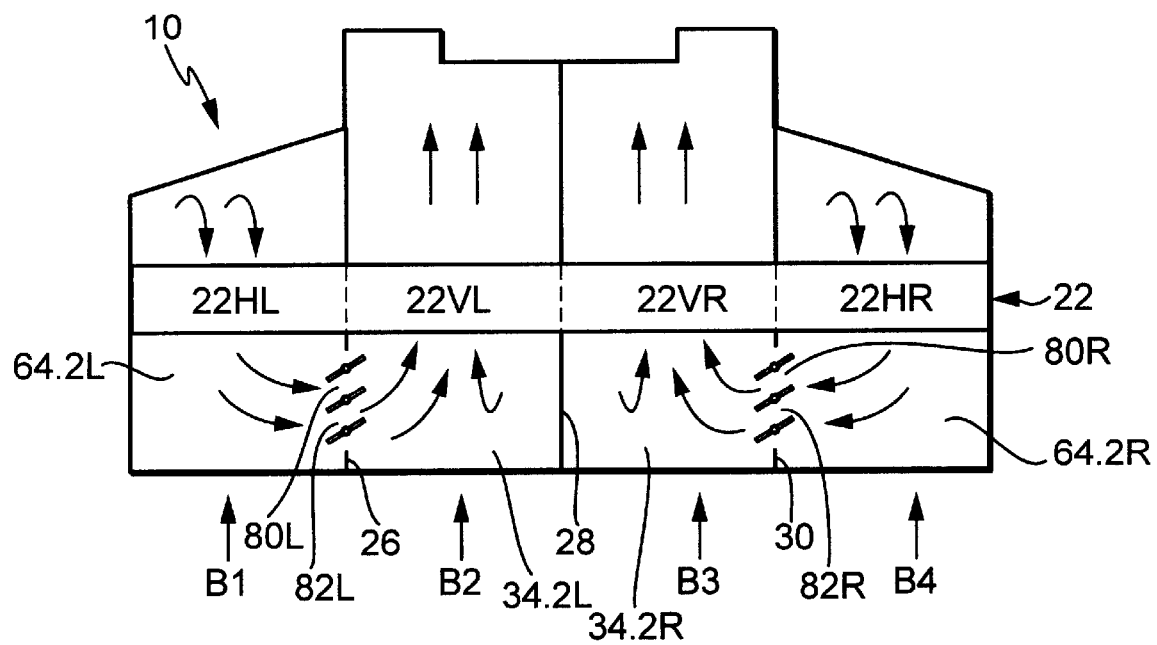
FIGS. 4a and 4b show views according to FIG. 3 of a further exemplary embodiment in two different operating modes.
Figure 4B:
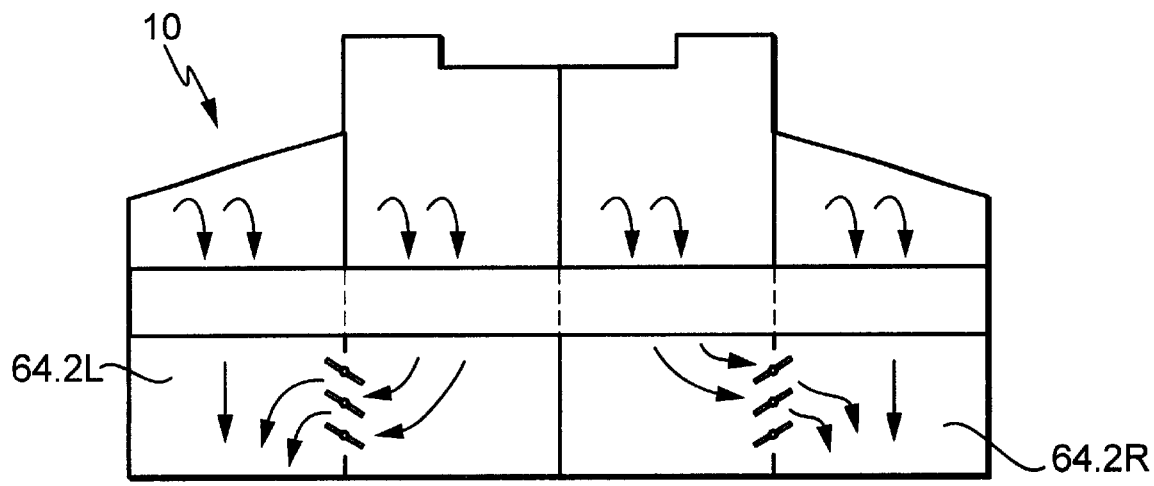

FIGS. 4a and 4b illustrate a second exemplary embodiment which differs from the first embodiment in that the dividing wall opening 82R or 82L with the louver flap 80R or 82L is provided on the other side of the heater 22, that is to say beneath the heater 22 when the heater is horizontally arranged.

In addition to the first operating mode, which is also possible with this embodiment without modification, the following further operating modes (illustrated in FIGS. 4a and 4b) are possible.

In the operating mode illustrated in FIG. 4a, the air flows in the region B4 or B1 through the heater 22 from the top to the bottom. The rear space air duct 70R is closed, and the louver flap 80R is opened. Heated air out of the space 64.2R or 64.2L can flow into the space 34.2R or 34.2L, and flow from there, together with the air in the region B3 or B2, through the heater 22 a second time, from which it is then supplied to the front space zone VR or VL. In a way similar to the second operating mode of the first exemplary embodiment, it is thus possible for all the air to be supplied to the front space, however with a portion of the air having passed through the heater 22 twice. This can be very advantageous, for example, for preventing or removing condensation on the windows.

In the operating mode illustrated in FIG. 4b, the direction of flow through the heater 22 in the region B3 or B2 is reversed, in comparison with the operating mode according to FIG. 4a, and the air channels to the front space and the flap 36.2R are closed. The heated air can be supplied to the space 64.2R or 64.2L via the dividing wall opening 82R or 82L, with the result that, overall, in this operating mode all the air can be supplied to the rear space zones HR and HL. In this operating mode, all the partial streams flow through the heater 22 just once.

The disclosure of German Patent Application No. 100 16 433.1, filed Apr. 1, 2000, is hereby incorporated by reference in its entirety.

Additional advantages and modifications of any of the above-described embodiments will readily occur to those skilled in the art. Therefore, the invention in its broader aspects is not limited to the specific details and representative devices, shown and described herein. Accordingly, various modifications may be made without departing from the spirit or scope of the invention as defined by the appended claims.

What is claimed is:

1. An air-conditioning system for a motor vehicle, comprising
   an evaporator for generating cold air;
   a heater for generating warm air, said heater having at least one dividing wall for dividing the air-conditioning system into at least two regions downstream of the evaporator, with said heater being present in each of the regions, and said dividing wall having a dividing wall opening; and
   a flap for selectively closing the dividing wall opening, said opening and flap being arranged such that first partial air stream conducted in a first region flows through a first heater sub-region located in said first region to produce a first heated partial air stream that can selectively be subsequently directed with said flap to flow through a second heater sub-region located in a second region, after passing through the dividing wall opening.

2. An air-conditioning system as claimed in claim 1, further comprising, in at least one of the regions, an air stream flow controller having a first operating position in which air flows in a first direction through the heater sub-region located in said region and a second operating position in which air flows through said same sub-region in a direction opposite to the first direction.

3. An air-conditioning system as claimed in claim 2, wherein the air stream flow controller comprises two air flaps, the first air flap being arranged between a cold air region located between the evaporator and the heater and a first space located at a first side of the heater, and the second air flap being arranged between the cold air region and a second space located at a second side of the heater.

4. An air-conditioning system as claimed in claim 3, whereas the heater is arranged so as to lie essentially horizontal, and the first space is arranged above the heater, and the second space is arranged underneath the heater.

5. An air-conditioning system as claimed in claim 1, comprising three of said dividing walls to form four regions arranged one next to the other, and comprises said dividing wall opening in each case in the two outermost dividing walls, wherein the central dividing wall separates the two center regions which form a first pair of regions assigned to zones in the interior front space of the vehicle, and the two outer regions form a second pair of regions assigned to zones in the interior rear space of the vehicle.

6. An air-conditioning system as claimed in claim 5, wherein the two outermost regions are assigned to the left and right zones of the rear space, and the two innermost regions are assigned to the left and right zones of the front space.

7. A method for air-conditioning for a motor vehicle, comprising:
   generating cold air by passing air through an evaporator;
   generating warm air by passing at least a partial stream of said cold air through a heater, said heater having at least one dividing wall for dividing the air-conditioning system into at least two regions downstream of the evaporator, with the heater being present in each of the regions, and said dividing wall having a dividing wall opening; and
   selectively closing the dividing wall opening to selectively conduct a first heated partial air stream, conducted in a first region through a first heater sub-region located in said first region, through a second heater sub-region located in a second region, after passing through the dividing wall opening, whereby the first heated partial air stream is passed through the heater twice.

* * * * *